United States Patent
Xiaoding et al.

(10) Patent No.: US 10,045,319 B2
(45) Date of Patent: Aug. 7, 2018

(54) FREQUENCY CORRECTION IN A MULTI-CARRIER COMMUNICATION SYSTEM

(71) Applicant: INTEL CORPORATION, Santa Clara, CA (US)

(72) Inventors: Li Xiaoding, Kirkland, WA (US); Lo Titus, Bellevue, WA (US)

(73) Assignee: INTEL CORPORATION, Santa Clara, CA (US)

( * ) Notice: Subject to any disclaimer, the term of this patent is extended or adjusted under 35 U.S.C. 154(b) by 100 days.

(21) Appl. No.: 14/992,903

(22) Filed: Jan. 11, 2016

(65) Prior Publication Data

US 2016/0128014 A1  May 5, 2016

Related U.S. Application Data

(63) Continuation of application No. 14/017,245, filed on Sep. 3, 2013, now Pat. No. 9,326,262, which is a continuation of application No. 13/154,331, filed on Jun. 6, 2011, now Pat. No. 8,526,411, which is a continuation of application No. 11/908,253, filed as application No. PCT/US2006/061881 on Dec. 11, 2006, now Pat. No. 7,957,341.

(60) Provisional application No. 60/749,072, filed on Dec. 9, 2005.

(51) Int. Cl.
*H04W 56/00* (2009.01)
*H04L 27/26* (2006.01)
*H04B 7/015* (2006.01)
*H04B 17/24* (2015.01)

(52) U.S. Cl.
CPC ........ *H04W 56/0035* (2013.01); *H04B 7/015* (2013.01); *H04B 17/24* (2015.01); *H04L 27/2602* (2013.01)

(58) Field of Classification Search
CPC ......... H04W 16/28; H04W 88/08; H04B 7/04
See application file for complete search history.

(56) References Cited

U.S. PATENT DOCUMENTS

| | | | |
|---|---|---|---|
| 5,166,951 A | * | 11/1992 | Schilling ................... H04L 5/02 375/145 |
| 5,715,235 A | | 2/1998 | Sawahashi et al. |
| 5,943,329 A | | 9/1999 | Ohgoshi et al. |

(Continued)

OTHER PUBLICATIONS

International Search Report and Written Opinion; International Application No. PCT/US06/61881; Filed Dec. 11, 2006; Applicant: Neocific, Inc.: dated Dec. 17, 2007; 12 pages.

*Primary Examiner* — Chandrahas B Patel
(74) *Attorney, Agent, or Firm* — Thorpe North & Western

(57) ABSTRACT

Methods and systems for correction of frequency errors in multi-carrier communication systems. The composite frequency error associated with the downlink signals are used to infer or derive the composite frequency error associated with the uplink signals, which are used to pre-compensate the uplink signals. Special signal components are transmitted by multiple base stations to facilitate frequency-error estimation and other system control functionalities at a mobile device. The mobile device carries out temporal, spatial, or spatial-temporal processing of the composite frequency errors associated with one or more base stations to determine the clock frequency error and the Doppler shift with respect to its serving base station.

17 Claims, 11 Drawing Sheets

(56) References Cited

U.S. PATENT DOCUMENTS

| | | |
|---|---|---|
| 6,181,948 B1 | 1/2001 | Kondo |
| 6,606,341 B1 * | 8/2003 | Kanterakis ............ H04B 7/2628 |
| | | 370/342 |
| 6,922,388 B1 * | 7/2005 | Laroia .................... H04J 3/0682 |
| | | 370/208 |
| 6,947,507 B2 | 9/2005 | Kelkar et al. |
| 7,120,431 B1 | 10/2006 | Huo et al. |
| 7,346,365 B1 * | 3/2008 | Hovers .................. H01Q 1/246 |
| | | 342/382 |
| 7,701,909 B2 | 4/2010 | Balachandran et al. |
| 7,953,417 B2 | 5/2011 | Laroia et al. |
| 7,957,341 B2 | 6/2011 | Li et al. |
| 8,014,476 B2 | 9/2011 | Filipovic et al. |
| 2002/0064246 A1 | 5/2002 | Kelkar et al. |
| 2004/0085892 A1 | 1/2004 | McMillan et al. |
| 2005/0063298 A1 | 1/2005 | Williquette |
| 2011/0235590 A1 | 9/2011 | Li et al. |

\* cited by examiner

FREQUENCY CORRECTION IN A MULTI-CARRIER COMMUNICATION SYSTEM

CROSS-REFERENCE TO RELATED APPLICATION(S)

This application is a continuation of U.S. patent application Ser. No. 14/017,245, filed Sep. 9, 2013, which is a continuation of U.S. patent application Ser. No. 13/154,331, filed Jun. 6, 2011, which is a continuation of U.S. patent application Ser. No. 11/908,253, filed Oct. 30, 2008, which is a National Stage of International Application No. PCT/US06/61881, filed Dec. 11, 2006, which claims the benefit of U.S. Provisional Patent Application No. 60/749,072, filed on Dec. 9, 2005, each of which are hereby incorporated by reference in their entirety.

TECHNICAL FIELD

The disclosed technology relates, in general, to wireless communication systems and, in particular, to frequency correction in multi-carrier communication systems.

BACKGROUND

In a multi-carrier communication system, such as an Orthogonal Frequency Division Multiple Access (OFDMA) system, the communicated signal consists of multiple sub-carriers (also termed "tones") that are designed to be mutually orthogonal when sampled at the right frequency points. Such orthogonality can be distorted by a number of factors, one of which is frequency error. In general, there are two potential sources of frequency error; namely, clock frequency error and Doppler shift. The clock frequency error is the difference in the clock frequency between a mobile device and its serving base station. Normally, the clock at the base station serves as the reference, to which the clock of a mobile device must be synchronized. The Doppler shift is caused by the movement of a mobile device relative to the base station, and the amount of shift depends on the speed and direction of the mobile device with respect to the base station.

The composite frequency error (i.e., the sum of all frequency errors including any clock frequency error and Doppler shift) can be corrected if known. In the downlink (DL) case, the composite frequency error can be estimated based on the downlink signals and corrected by the receiver at the mobile device. In the uplink (UL) case, since the signals received by the base station consist of signals transmitted by multiple mobile devices, the composite frequency error is a mixture of frequency errors from different mobile devices. It may take a very complex process to mitigate the adverse effects of the combined errors at the base station. It would therefore be beneficial to develop an improved method of correcting for frequency errors in an environment with multiple mobile devices.

DETAILED DESCRIPTION

Figure 1:
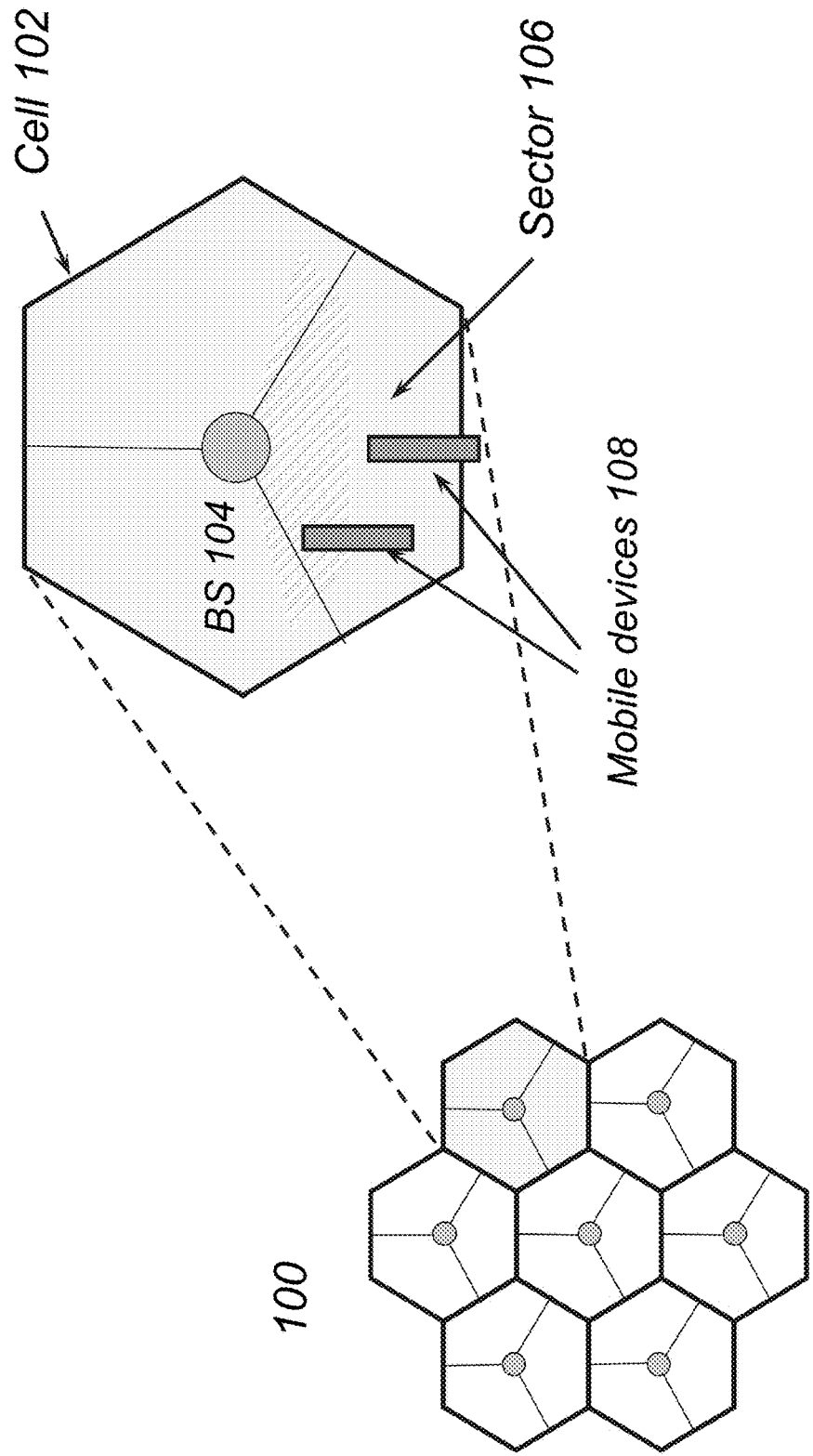
FIG. 1 illustrates the coverage of a wireless communication network that is comprised of a plurality of cells.

Methods and systems for correction of frequency errors in multi-carrier communication systems are disclosed. Frequency errors for both downlink (DL) and uplink (UL) are corrected at a mobile device based on estimates of Doppler shift and clock frequency error, using either a hybrid (analog and digital) method or a purely-digital method to compensate for the frequency error in subsequent communications.

In some embodiments, downlink signals transmitted by a base station include a special signal component in the format of a preamble, midamble, postamble, code sequence, pilots, or control channel/subchannel in either the frequency or time domain that is designed to facilitate frequency-error estimation and other system control functionalities.

In some embodiments, a mobile device carries out temporal, spatial, or spatial-temporal processing of the composite frequency errors associated with one or more base stations to determine the clock frequency error and the Doppler shift with respect to its serving base station.

In some embodiments, a clock frequency error calibration table is stored in the mobile device, where the clock frequency error is tabulated as a function of an operational temperature and other factors.

In some embodiments, a mobile device sends a signal in a particular format to a base station to allow the base station to estimate the composite frequency error. After estimating the composite frequency error, the base station transmits information about the composite frequency error to the mobile device via a particular channel/subchannel (dedicated or otherwise), and the mobile device extracts the information and utilizes the information to pre-compensate for composite frequency errors in subsequent transmissions.

The following discussion contemplates the application of the disclosed technology to a multi-carrier system, such as Orthogonal Frequency Division Multiplexing (OFDM), Orthogonal Frequency Division Multiple Access (OFDMA), or Multi-Carrier Code Division Multiple Access (MC-CDMA). The invention can be applied to either Time Division Duplexing (TDD) or Frequency Division Duplexing (FDD). Without loss of generality, OFDMA is therefore only used as an example to illustrate the present technology.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Wireless Communication Network

FIG. 1 is a representative diagram of a wireless communication network 100 that services a geographic region. The geographic region is divided into a plurality of cells 102, and wireless coverage is provided in each cell by a base station (BS) 104. One or more mobile devices 108 may be fixed or may roam within the geographic region covered by the network. The mobile devices are used as an interface between users and the network. Each base station is connected to the backbone of the network, usually by a dedicated link. A base station serves as a focal point to transmit information to and receive information from the mobile devices within the cell that it serves by radio signals. Those skilled in the art will appreciate that if a cell is divided into sectors 106, from a system engineering point of view each sector can be considered as a cell. In this context, the terms "cell" and "sector" are interchangeable.

Figure 2:
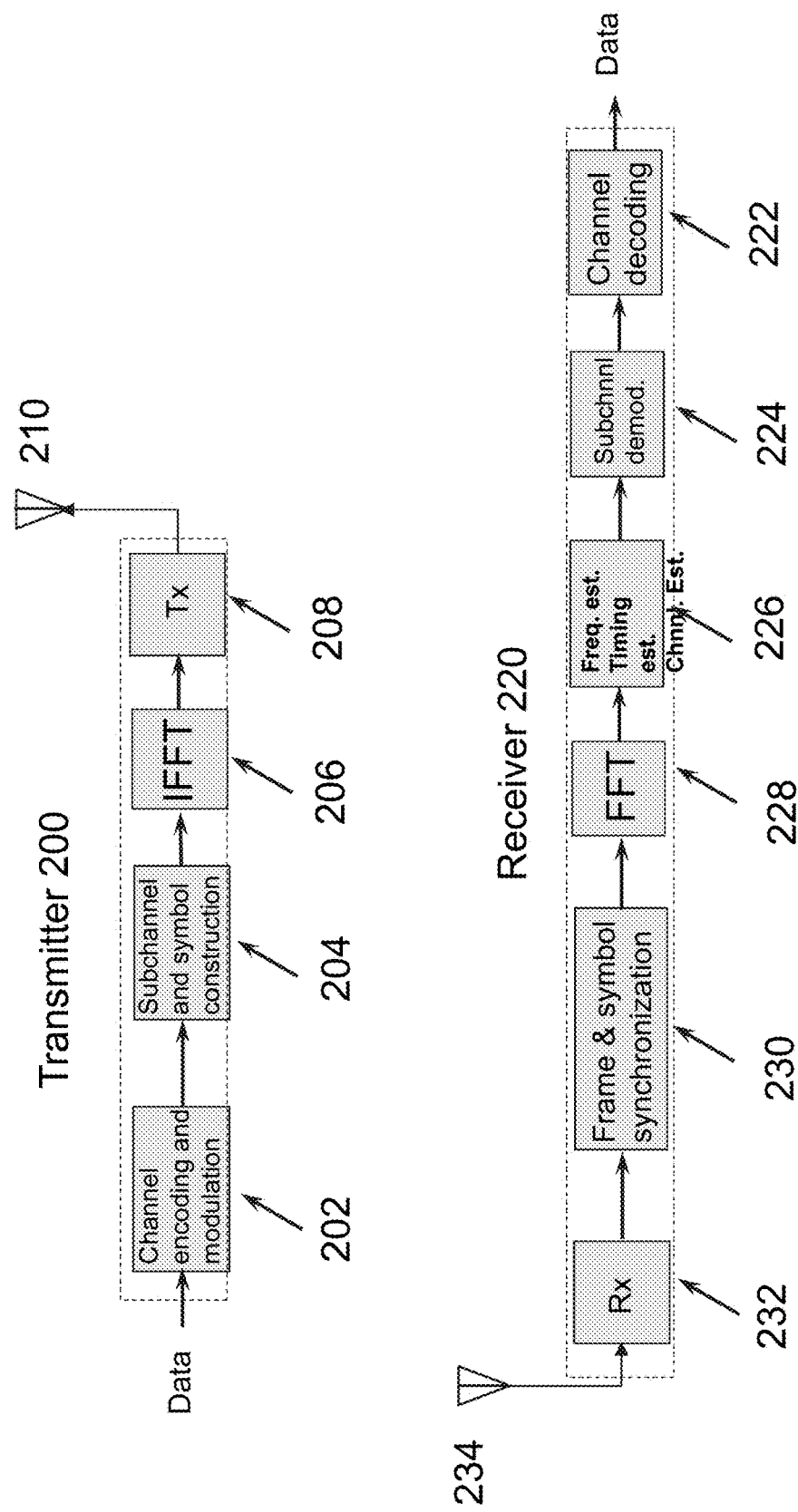
FIG. 2 is a block diagram of a receiver and a transmitter, such as might be used in a multi-carrier wireless communication network.

In a wireless communication system with base stations and mobile devices, the transmission from a base station to a mobile device is called a downlink (DL) and the transmission from a mobile device to a base station is called an uplink (UL). FIG. 2 is a block diagram of a representative transmitter 200 and receiver 220 that may be used in base stations and mobile devices to implement a wireless communication link. The transmitter comprises a channel encoding and modulation component 202, which applies data bit randomization, forward error correction (FEC) encoding, interleaving, and modulation to an input data signal. The channel encoding and modulation component is coupled to a subchannel and symbol construction component 204, an inverse fast Fourier transform (IFFT) component 206, a radio transmitter component 208, and an antenna 210. Those skilled in the art will appreciate that these components construct and transmit a communication signal containing the data that is input to the transmitter 200. Other forms of transmitter may, of course, be used depending on the requirements of the communication network.

The receiver 220 comprises an antenna 234, a reception component 232, a frame and synchronization component 230, a fast Fourier transform component 228, a frequency, timing, and channel estimation component 226, a subchannel demodulation component 224, and a channel decoding component 222. The channel decoding component de-interleaves, decodes, and derandomizes a signal that is received by the receiver. The receiver recovers data from the signal and outputs the data for use by the mobile device or base station. Other forms of receiver may, of course, be used depending on the requirements of the communication network.

Figure 3:
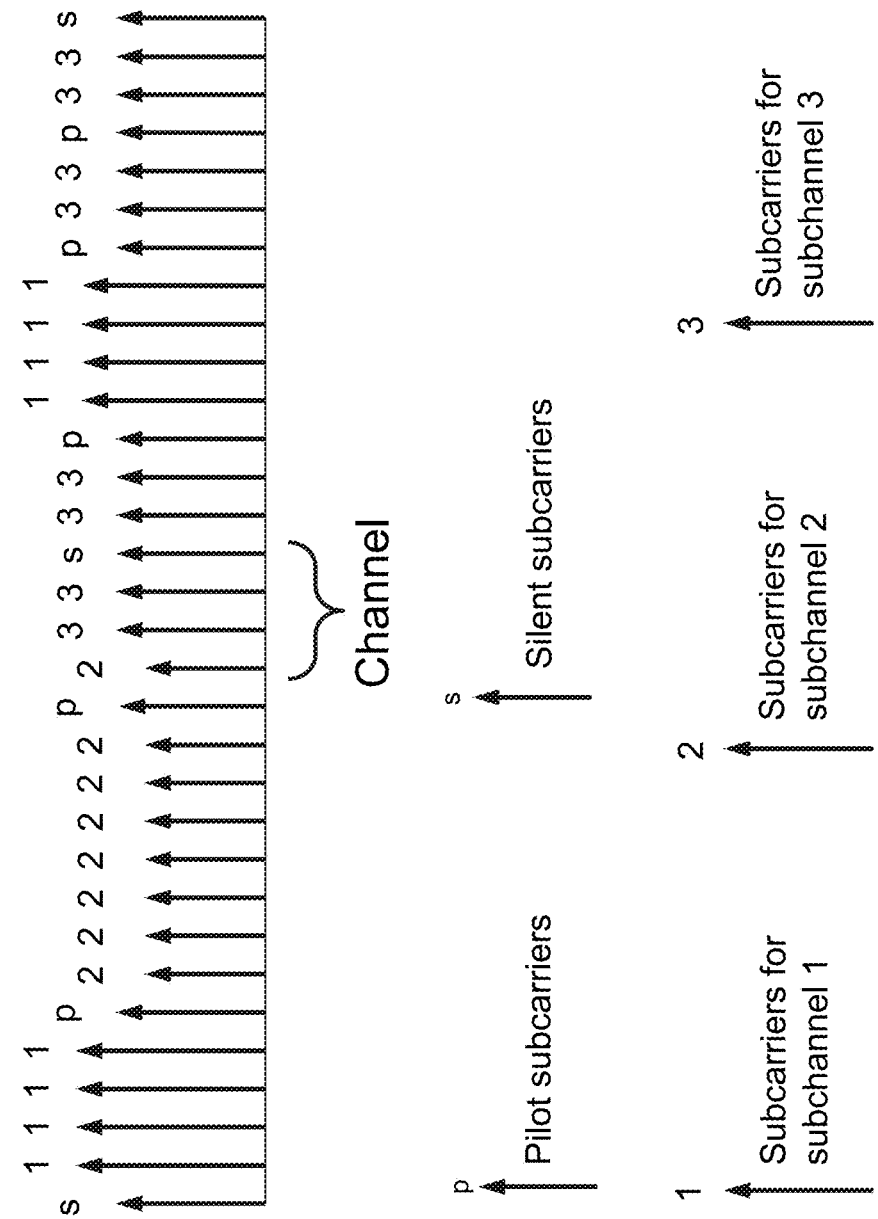
FIG. 3 is a graphical depiction of a multi-carrier signal structure in the frequency domain.

FIG. 3 is a signal diagram depicting the various subcarriers and subchannels that are contained within a given channel. There are three types of subcarriers: (1) data subcarriers, which carry information data; (2) pilot subcarriers, whose phases and amplitudes are predetermined and made known to all receivers, and which are used for assisting system functions such as estimation of system parameters; and (3) silent subcarriers, which have no energy and are used for guard bands and as a DC carrier. The data subcarriers can be arranged into groups called subchannels to support scalability and multiple-access. The subcarriers forming one subchannel may or may not be adjacent to each other. Each mobile device may use some or all of the subchannels.

Figure 4:
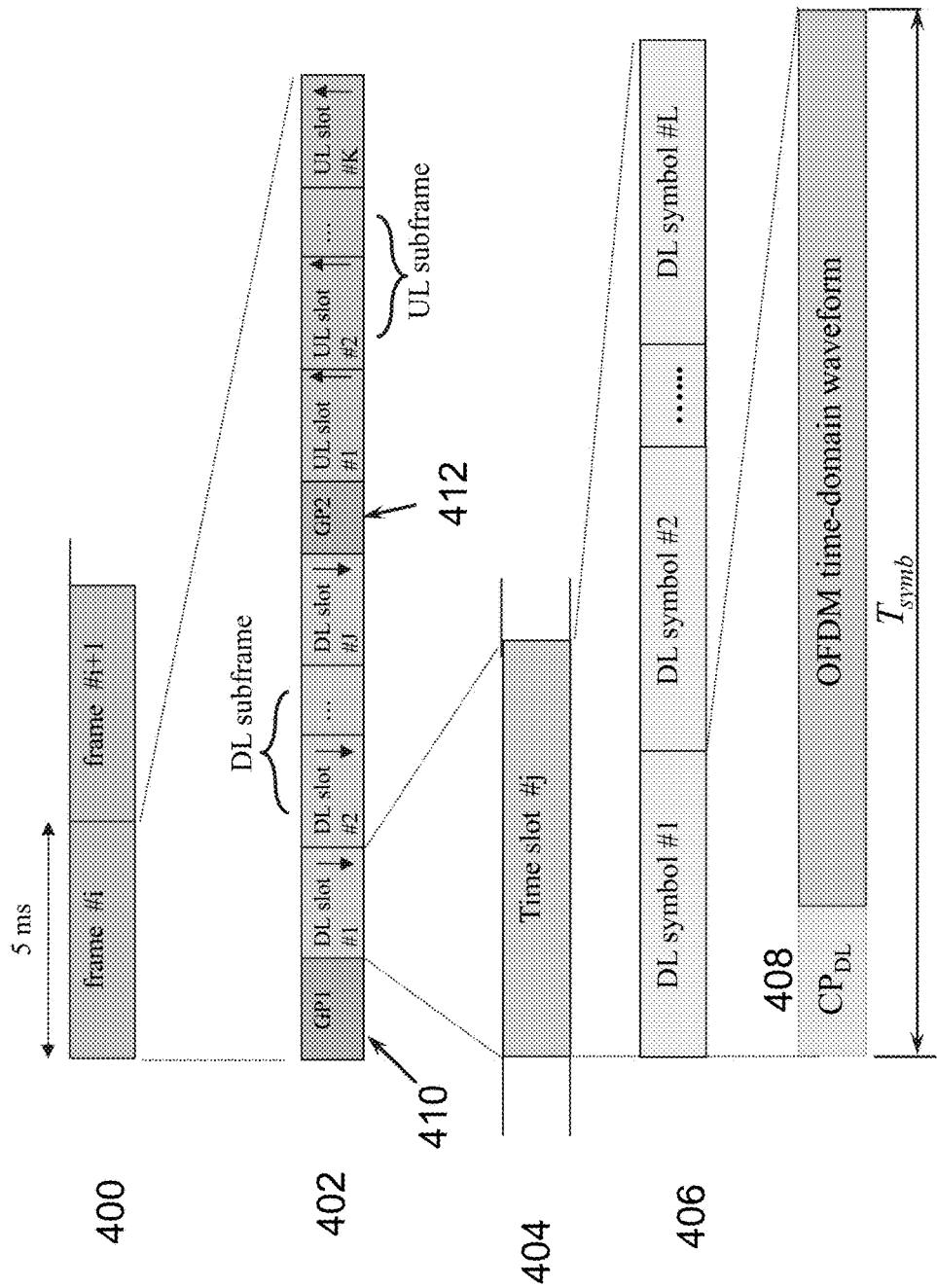
FIG. 4 is a graphical depiction of a multi-carrier signal structure in the time domain.

FIG. 4 depicts the basic structure of a multi-carrier signal in the time domain, which is generally made up of time frames 400, subframes 402, time slots 404, and OFDM symbols 406. A frame consists of a number of time slots, and each time slot is comprised of one or more OFDM symbols. The OFDM time domain waveform is generated by applying an inverse-fast-Fourier-transform (IFFT) to the OFDM signals in the frequency domain. A copy of the last portion of the time waveform, known as the cyclic prefix (CP) 408, is inserted in the beginning of the waveform itself to form the OFDM symbol. In the case of TDD, guard periods (GP1 410 and GP2 412), are inserted between an uplink (UL) subframe and a downlink (DL) subframe and between a DL subframe and a UL subframe to account for the time needed to turn on and off transmitters and receivers, as well as radio propagation delay.

II. Frequency Correction in a Multi-Carrier Communication System

A Frequency Errors

There are two potential sources of frequency errors that will adversely affect the signal quality of an OFDM system; namely, clock frequency error and Doppler shift. The clock frequency error is the difference in the clock frequency between the mobile device and its serving base station. Normally, the clock at the base station serves as the reference, to which the clock of a mobile device must be synchronized. The Doppler shift is caused by the movement of a mobile device relative to the base station, and the amount of shift depends on the speed and direction of the mobile device with respect to the base station.

In the downlink case where the base station transmits a signal to the mobile device, the received signal at the mobile device is characterized by the following equation (1):

$$r_{DL}(t) = s_{DL}(t)e^{j2\pi(f_0+f_d)t}e^{-j2\pi(f_0+f_e)t} = s_{DL}(t)e^{j2\pi(f_d-f_e)t} = s_{DL}(t)e^{j2\pi\delta f_{DL}t}$$

where $f_0$ denotes the carrier frequency of the transmitted signal from the base station, $f_e$ denotes the clock frequency error of the mobile device with respect to that of the base station, and $f_d$ denotes the Doppler shift. The downlink composite frequency error is therefore represented by $\delta f_{DL} = f_d - f_e$, of which should be corrected at the mobile device receiver.

In the uplink case where the mobile device transmits a signal $s_{UL}(t)e^{j2\pi(f_0+f_e)t}$, the received signal at the base station is characterized by the following equation (2):

$$r_{UL}(t) = s_{UL}(t)e^{j2\pi(f_0+f_e+f_d)t}e^{-j2\pi f_0 t} = s_{UL}(t)e^{j2\pi(f_d+f_e)t} = s_{UL}(t)e^{j2\pi\delta f_{UL}t}$$

Wherein each of the variables is the same as in equation (1) and $\delta f_{UL} = f_d + f_e$ denotes the uplink composite frequency error. In an OFDMA system, the signals received by the base station are normally the combination of signals from multiple mobile devices. Because the uplink composite frequency error ($\delta f_{UL}$) in the signal from each mobile device is typically different, a complex process would be necessary to mitigate the adverse effects of the uplink composite frequency errors at the base station. Rather than attempting to mitigate the adverse effects of the uplink composite frequency errors at the base station, therefore, the disclosed technology pre-compensates for the error at each mobile device before transmission.

The clock frequency error depends on a number of external factors, such as the applied voltage of the power supply and the operating temperature at the mobile device, and is a time-variant parameter $f_e(t)$. In common practice, a voltage regulator is used to stabilize the power supply to the clock. Furthermore, in a normal operating environment, the temperature does not change rapidly and drastically. Therefore, it is expected that $f_e(t)$ varies relatively slowly and its coherence time $(\tau_e)$ is in the order of minutes or greater. It follows that the average of the clock frequency error over a certain period of time T can be modeled by the following equation (3):

$$\text{clock\_frequency\_error} = \frac{1}{T}\int_0^T f_e(t)dt = \overline{f_e}, \text{ where } T << \tau_e$$

The Doppler shift is a time-variant and spatial-variant parameter $f_d(t)$ that varies depending on the relative motion of the mobile device with respect to the base station. In a typical urban environment, the speed of a mobile device is low and it may change directions frequently, and strong multipath signals arrive at the mobile device with different values of Doppler shift. In a suburban environment, a mobile device tends to move in one direction for longer period of time, but its speed is relatively high which thereby causes a variation in Doppler shift. The fast movement of a mobile device may also cause frequent handover from one base station to the next and the mobile device will therefore experience a sudden change in the Doppler shift as the handoff occurs. Therefore, in a normal operating conditions, the Doppler shift may vary relatively fast and its coherence time $(\tau_d)$ is in the order of seconds. It follows that the average of the Doppler shift over a certain period of time T can be modeled by the following equation (4):

$$\text{Doppler\_shift} = \frac{1}{T}\int_0^T f_d(t)dt = 0, \text{ where } T >> \tau_d$$

Figure 5:
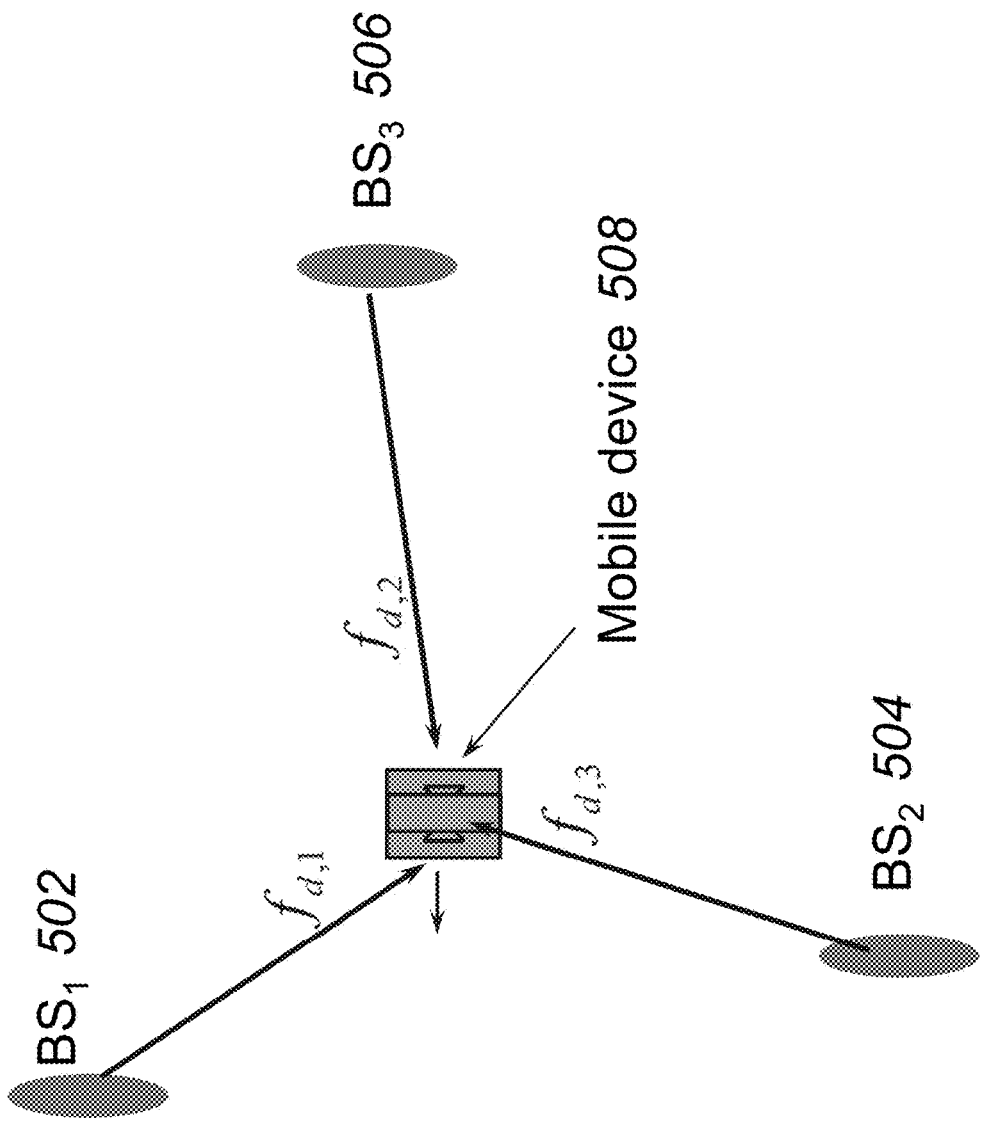
FIG. 5 is a graphical depiction a mobile device receiving downlink signals transmitted by multiple base stations.

At any instant in time, a mobile device within a cellular network can normally detect multiple values of Doppler shift associated with the signals from multiple base stations. FIG. 5 depicts a mobile device 508 that may be in communication with base station 502, base station 504, and base station 506. Because the mobile device's motion relative to each base station is different, the value of Doppler shift ($\{f_{d,k}\}_{k=1}^K$) associated with each base station will be different. The downlink composite frequency error associated with the $k^{th}$ base station is expressed by the following equation (5):

$$\delta f_{DL,k}(t) = f_{d,k}(t) - f_e(t)$$

Since the speed and direction of the moving mobile device is different with respect to each of the base stations, the values of Doppler shift associated with each base station is different and tend to cancel each other out if summed.

B. Frequency Error Estimation

To enable a mobile device to pre-compensate for frequency errors in subsequent transmissions, the device utilizes an estimate of the composite frequency error ($\delta f_{UL}$) or both the Doppler shift ($f_d(t)$) and clock frequency error ($f_e$). Such estimates may be determined using a variety of different techniques. To facilitate frequency-error estimation and other system control functionalities, a base station may transmit a special signal component in the format of a preamble, midamble, postamble, code sequence, pilots, or control channel/subchannel in either the frequency or time domain. The special signal component transmitted by a base station is orthogonal or near-orthogonal in frequency, time, or code to those transmitted by other base stations that are located in and provide service to adjacent cells. Furthermore, the signal component is transmitted by the base stations periodically, for example, within an OFDM symbol, in every slot or every multiple slots, and/or in every frame or every multiple frames.

Figure 6:
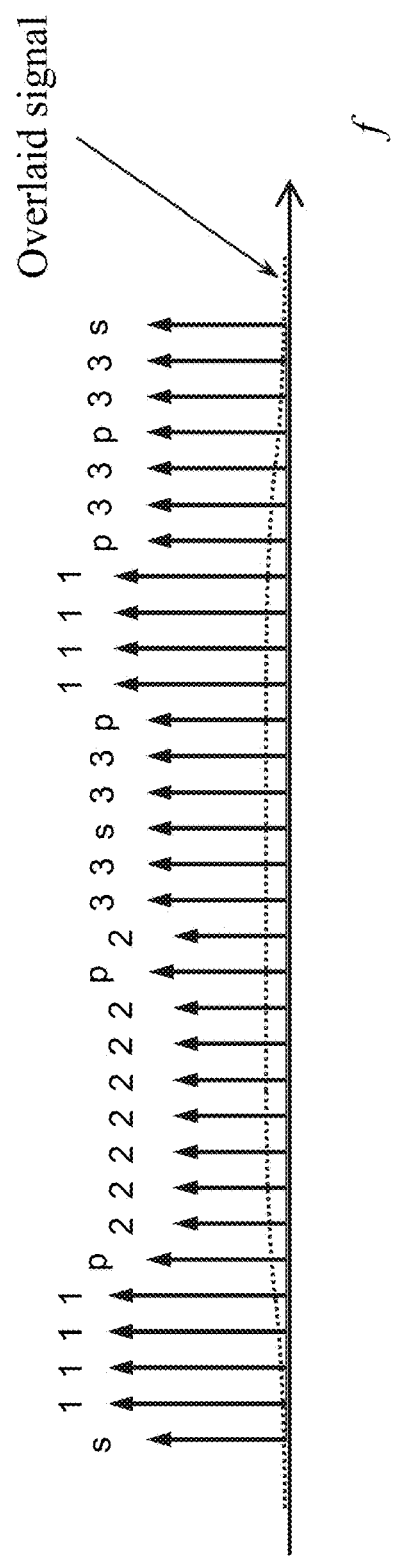
FIG. 6 is a graphical depiction of overlaying a special signal component in the form of a spread-spectrum signal on an OFDM symbol in the frequency domain.
Figure 7:
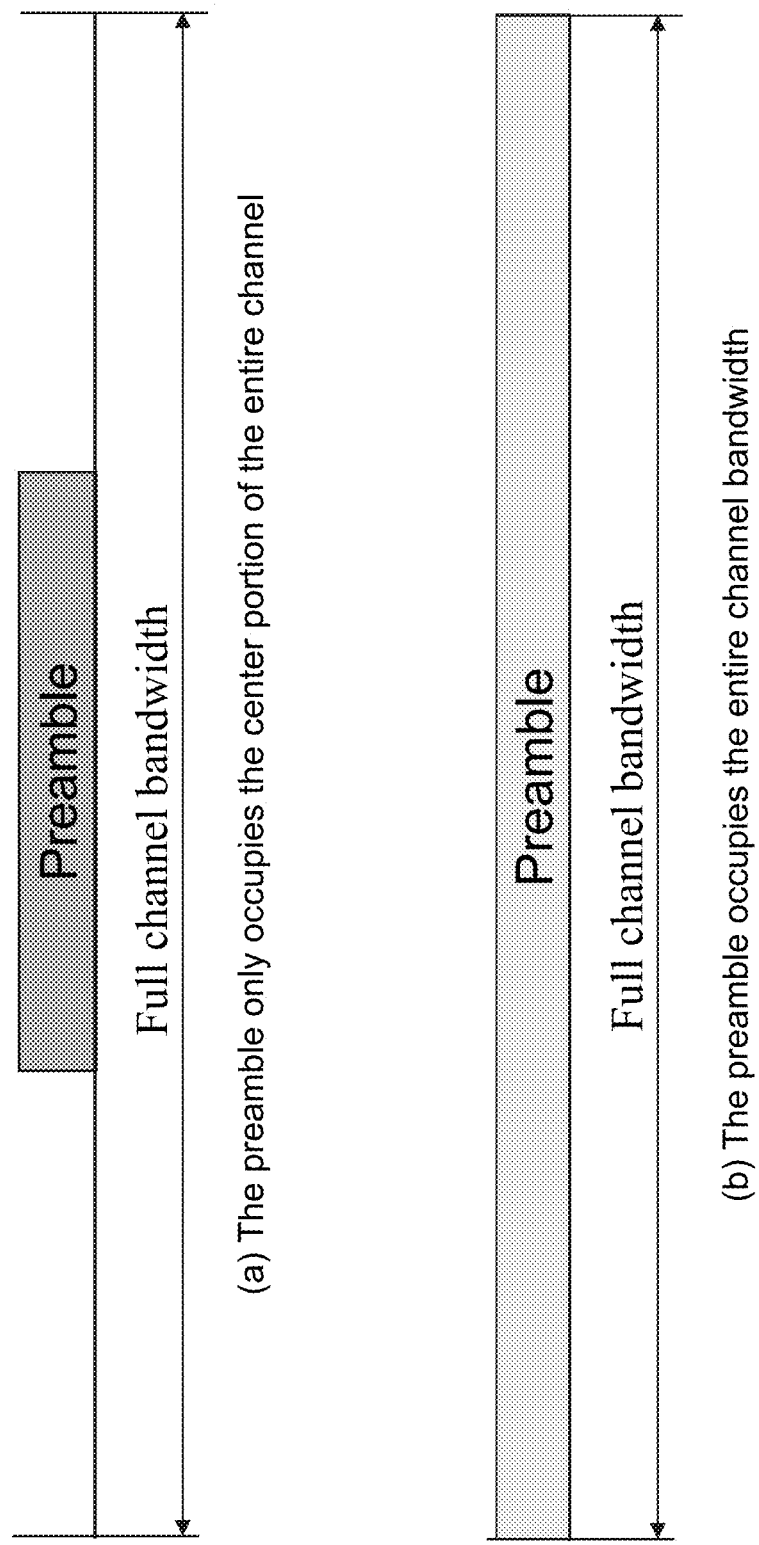
FIG. 7 is a graphical depiction of a preamble occupying a portion of a channel bandwidth and an entire channel bandwidth.

In some embodiments, the special signal component is overlaid on other types of signals in the time or frequency domain (e.g., on an OFDM symbol in the frequency domain as shown in FIG. 6) and may occupy the entire or partial bandwidth of the channel, as depicted by the examples shown in FIG. 7. When the special signal component only partially occupies an available bandwidth, the occupied portion does not have to be contiguous.

In some embodiments, a group of base stations may transmit the identical special signal component simultaneously to facilitate the frequency error estimation by the mobile devices. For example, common pilot subcarriers may be transmitted by a group of base stations within the same OFDM symbol period.

In determining the clock frequency error and the Doppler shift with respect to its serving base station, a mobile device estimates, based on the special signal components it receives from a group of base stations, the composite frequency errors with respect to these base stations. The mobile device then carries out temporal, spatial, or spatial-temporal processing of the estimated errors associated with the group of base stations to determine the clock frequency error and the Doppler shift with respect to its serving base station.

Figure 8:
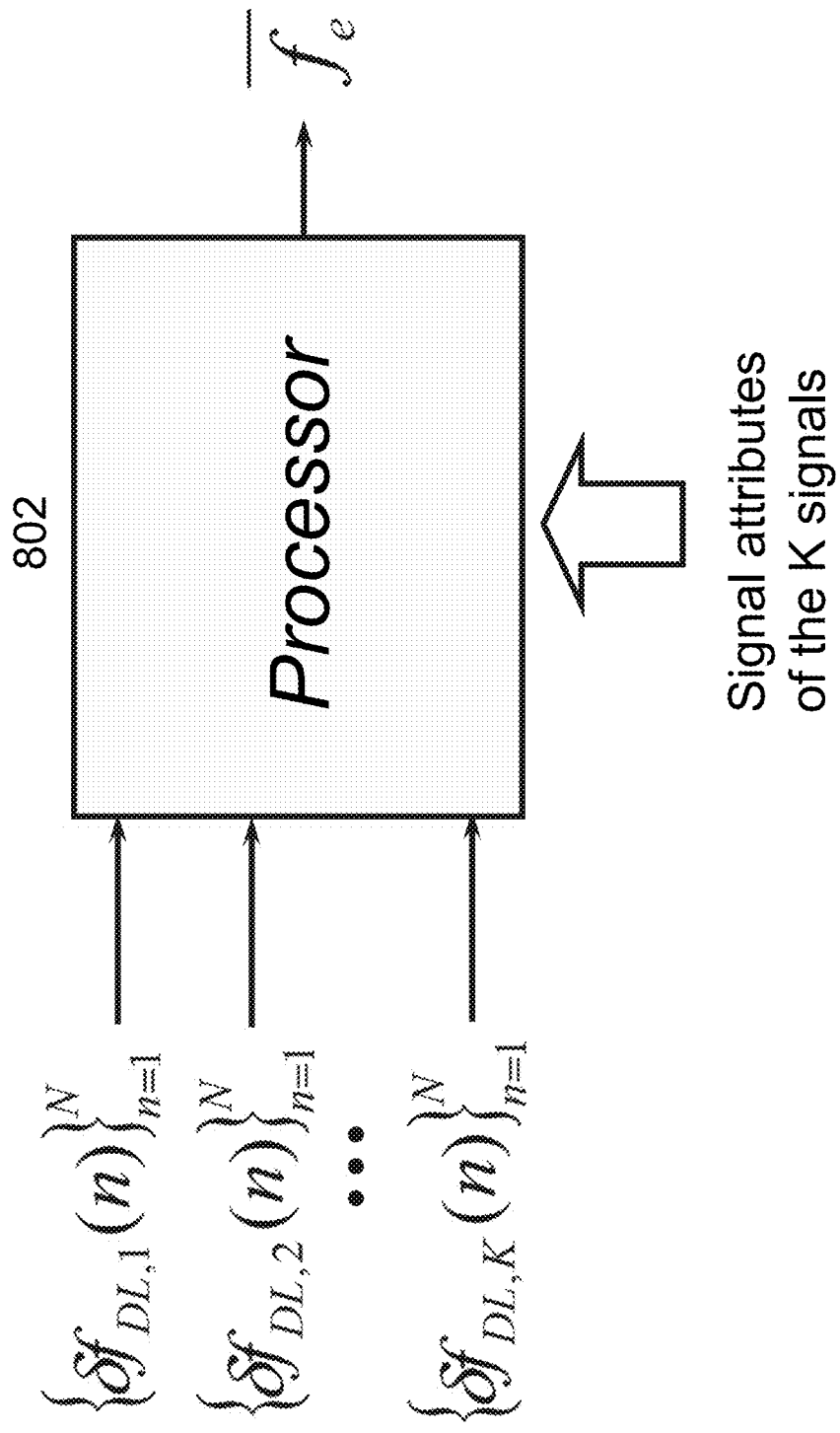
FIG. 8 is a block diagram of a spatial-temporal processor.

FIG. 8 is a block diagram depicting inputs to a processor 802 that may be used to implement spatial-temporal, temporal-only, or special-only processing. In some embodiments the estimates of the composite frequency errors associated with K base stations over N temporal samples are input to the processor 802 for spatial-temporal processing, where N is chosen such that $\delta_d << T << \delta_e$. In practice, N can be in the order of hundreds of slots or tens of frames. Signal attributes with respect to time and individual base stations, such as signal strength and/or SNR, are also input to the processor 802 and utilized in the processing. The output of the processor 802 is an estimate of the clock frequency error. The processor 802 may consist of memory and coding circuits to realize a multi-dimensional low-pass filter (LPF) of a particular form, such as a finite impulse response (FIR), infinite impulse response (IIR), adaptive, linear, or non-linear filter with its pass-bandwidth less than the bandwidth of $f_d(t)$ and greater than that of $f_e(t)$. The signal attributes are used in the spatial-temporal process to obtain the results in the optimal statistical sense, such as maximum SNR, maximum likelihood, or minimum mean-squared error.

When the processor 802 is configured to implement a linear FIR filter, the output of the processor can be expressed by the following equation (6):

$$\tilde{f}_e = -\sum_{k=1}^K \sum_{n=1}^N \alpha_{k,n} \beta_{k,n} \delta f_{DL,k}(n)$$

where $\alpha_{k,n}$ is the filter coefficient and $\beta_{k,n}$ is the signal attribute with respect to the time index (n) and the base station index (k). The estimate of the Doppler shift with respect to its serving base station (for example, Base Station 1 in FIG. 5) is then expressed by the following equation (7):

$$f_{d,1}(n) = \delta f_{DL,1}(n) + \tilde{f}_e$$

Alternatively, the uplink composite frequency error is expressed by the following equation (8):

$$\delta f_{UL,1}(t) = \delta f_{DL,1}(t) + 2\tilde{f}_e$$

The spatial-temporal processing can further be realized by using a two-dimensional averaging or low-pass filter with its coefficients weighted by the corresponding signal attributes, such as signal strength and/or SNR. In some embodiments, the spatial-temporal processing is realized by using first a one-dimensional averaging or low-pass filter in the time domain and then a second one-dimensional averaging or low-pass filter in the spatial domain with the coefficients of the filters weighted by the appropriated signal attributes.

In some embodiments, the estimates of the composite frequency errors are input to a processor 802 for temporal-only processing to determine the clock frequency error. The estimates of the composite frequency errors associated with K base stations over N temporal samples are input to the processor for temporal averaging or filtering, where N is chosen such that $\delta_d \ll T \ll \delta_e$. Signal attributes with respect to time can be used to weight the coefficients of the filter. Temporal-only processing can be used in applications or situations such as:
1. when a group of base stations transmit the same signal (e.g. in a single frequency network);
2. when a group of base stations transmit the same special signal component;
3. when signals from only one base station are available;
4. when the signals from one base station are dominant in signal strength; or
5. when the mobile device is configured to work with only the signals from its serving base station.

In some embodiments, the estimates of the composite frequency errors are input to a processor 802 for spatial-only processing to determine the clock frequency error. In spatial-only processing, the estimates of the composite frequency errors associated with K base stations at an instant are input to the processor 802 for spatial averaging or filtering, with the filter coefficients weighted by the signal attributes associated with the K respective base stations.

In some embodiments, the spatial or spatial-temporal processing also applies to cases where the mobile device is capable of simultaneously receiving multiple signals through multiple receivers.

In some embodiments, instead of inferring the Doppler shift from the composite frequency error the Doppler shift can be directly computed based on the information of the movement (including speed and direction) of the mobile device relative to its serving base station. Movement of the mobile device can be derived from a location component (e.g., global positioning system (GPS) device) that is integrated in the mobile device or in another system (e.g., an automobile) that is in communication with the mobile device, from triangulation from one or more signals received from base stations, or by using any other method that allows the movement of the mobile device to be tracked.

In some embodiments, the clock of a mobile device can be calibrated by maintaining a clock frequency error calibration table. The clock frequency error calibration table is stored in the mobile device, and used to maintain a record of the clock frequency error as a function of the operational temperature and other factors. The values of such a calibration table are initialized during manufacturing testing or are preset with default values. The calibration table can be updated based on the estimate of the clock frequency error ($\tilde{f}_e$) and the corresponding operational temperature setting that is supplied by a thermo-sensor. Given a current operational temperature, the corresponding clock frequency error can be identified in the calibration table and used directly or in conjunction with the current estimates of the clock frequency error to correct the frequency error.

In some embodiments, the composite frequency error may be determined for the uplink using a closed-loop process. In the closed-loop process the mobile device sends a signal in a particular format to the base station to allow the base station to estimate, by a certain method, the composite frequency error. The base station transmits information pertaining to the composite frequency error to the mobile device via a particular channel/subchannel (dedicated or otherwise); and the mobile device extracts the information and uses the information to pre-compensate for frequency error during the subsequent transmission of signals.

In the closed-loop process, the signal that the mobile device sends to the base station to enable the estimation of the composite frequency error is coded either in the frequency domain or in the time domain and occupies all of or a portion of the channel. The signal can be specially designed for frequency estimation or can be a general purpose signal such as a ranging signal.

The information of the composite frequency error transmitted by the base station to the mobile device can be in the form of an actual frequency error value, an incremental value, an explicit value, an implicit value, or any other suitable format and can be represented in a dedicated bit field or embedded in a data field. The transmitted information can be encoded or uncoded.

A tracking filter may be applied to the estimates of the composite frequency error to smooth out noise components. The mobile device may periodically send the enabling signal to the base station so as to update the frequency error information.

Figure 9:
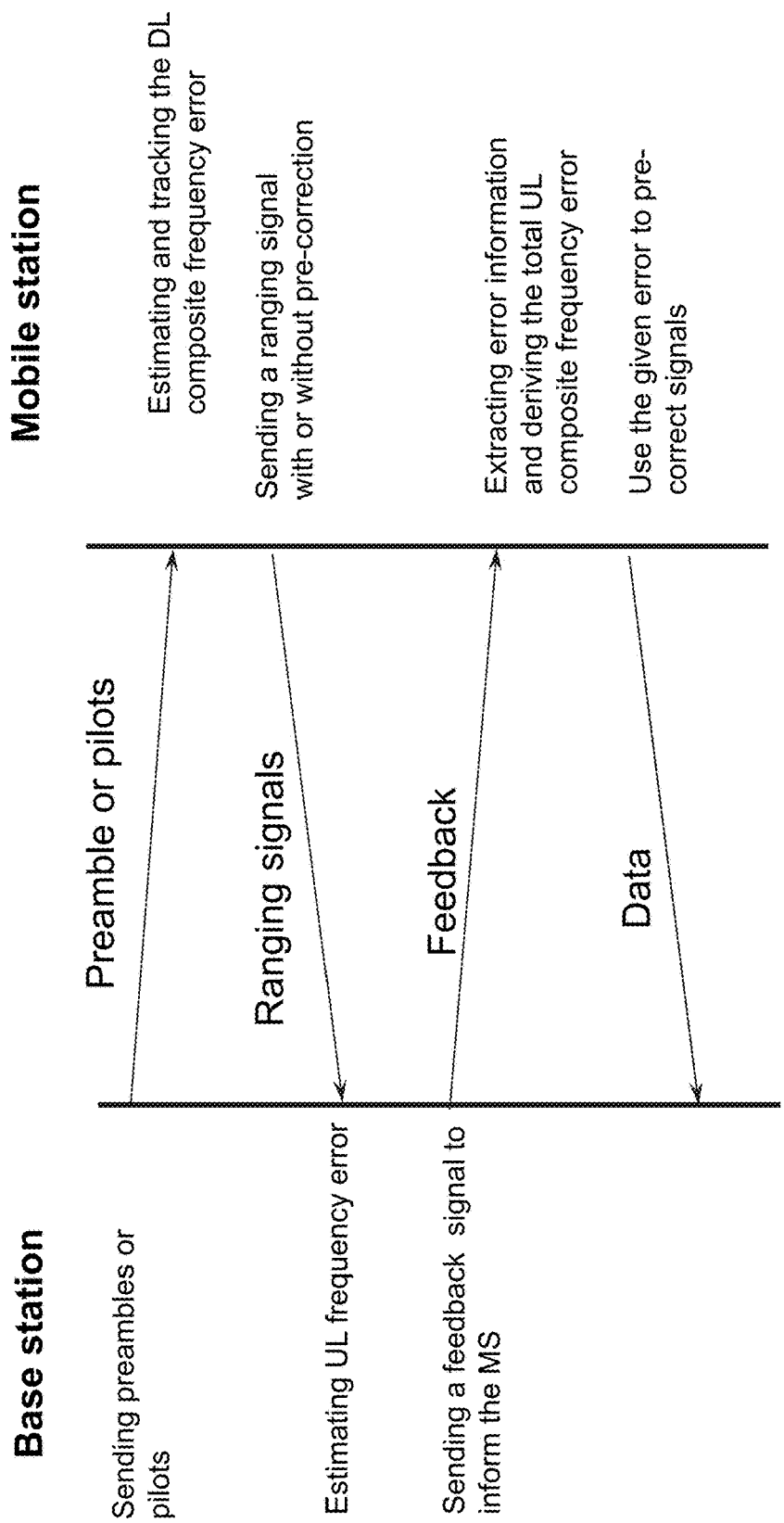
FIG. 9 is a communication diagram of a closed-loop process for determining an uplink composite frequency error.

An example of a specific closed-loop process is illustrated in the communication diagram of FIG. 9. The communication flow depicted in FIG. 9 implements the following functions:
1. When powered on, the mobile device searches for a serving base station and then carries out frequency synchronization based on the downlink signals (e.g., preambles) from the base station by estimating and tracking the downlink composite frequency error ($\delta f_{DL}$).
2. The mobile device sends a signal, such as a ranging signal, to the base station to facilitate the estimation of the frequency error. The mobile device may or may not pre-correct the signal phase by $\delta f_{DL}$.
3. Based on the signal sent by the mobile device, the base station carries out, using a particular signal processing technique, the estimation of the frequency error. In the case without any pre-correction, the error is $\delta f_{UL}$ and in the case of pre-correction with ($\delta f_{DL}$), the error becomes $\delta f_{UL} - \delta f_{DL}$. Once the error is determined, the base station transmits the error information to the mobile device.
4. The mobile device extracts the error information, from which the composite frequency error ($\delta f_{UL}$) is inferred and applied to pre-compensate the signal for the frequency error before transmission.

C Frequency Correction

Regardless of which techniques are used to estimate the Doppler shift and clock frequency error for the mobile device, once the Doppler shift and clock frequency error have been determined they may be used to correct frequency errors for both downlink communications to and uplink communications from the device. The frequency of a received signal may be corrected for the downlink composite frequency error by rotating the signal with a phase value equal to the error but in the opposite direction; as represented by the following equation (7):

$$r_{DL}(t)e^{-j2\pi\delta f_{DL}t} = s_{DL}(t)(e^{j2\pi\delta f_{DL}t})(e^{-j2\pi\delta f_{DL}t}) = s_{DL}(t)$$

The frequency of a signal to be transmitted may be pre-compensated for the anticipated composite frequency error accrued in the uplink transmission. The pre-compensation is achieved by rotating the signal with the phase value equal to the error but in the opposite direction; as represented by the following equation (8):

$$s'_{UL}(t) = s_{UL}(t)e^{-j2\pi\delta f_{UL}t}$$

At the base station, the received signal can be recovered without the adverse effect caused by the composite frequency error, as represented by the following equation (9):

$$r_{UL}(t) = s'_{UL}(t)e^{j2\pi(f_0+f_e+f_d)t}e^{-j2\pi f_0 t} = s_{UL}(t)$$

Figure 10:
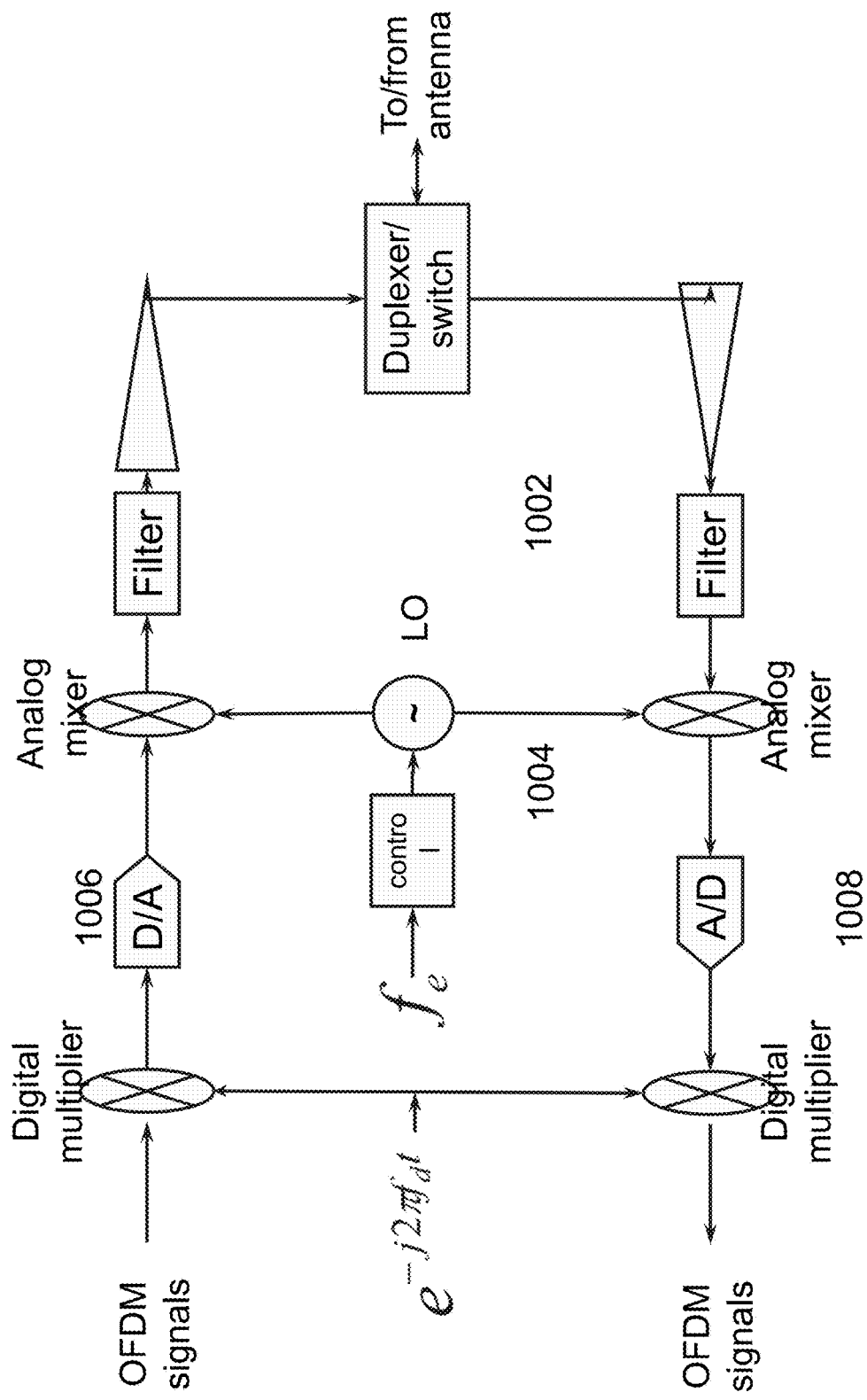
FIG. 10 is a block diagram of a signal conditioning circuit that utilizes a hybrid approach to frequency error correction.

In some embodiments, the clock frequency error is corrected by adjusting a local oscillator of the mobile device, whereas the Doppler shift is compensated for by digitally rotating the phase of the uplink or downlink signals appropriately in the time domain. A specific example is given in FIG. 10 of this hybrid approach to composite frequency error correction. FIG. 10 is a block diagram of a signal conditioning circuit that operates in the analog and digital domains in order to correct for composite frequency errors. The clock frequency error is corrected in the analog domain by adjusting a local oscillator 1002 using a control 1004 to modify the oscillation of the local oscillator by an amount equal to the estimated clock frequency error $f_e$. The Doppler shift is corrected in the digital domain by rotating the phase of a signal to be transmitted using a digital multiplier 1006 (to pre-compensate signals for transmission) or by rotating the phase of a signal that has been received using a digital multiplier 1008 (to compensate received signals).

Figure 11:
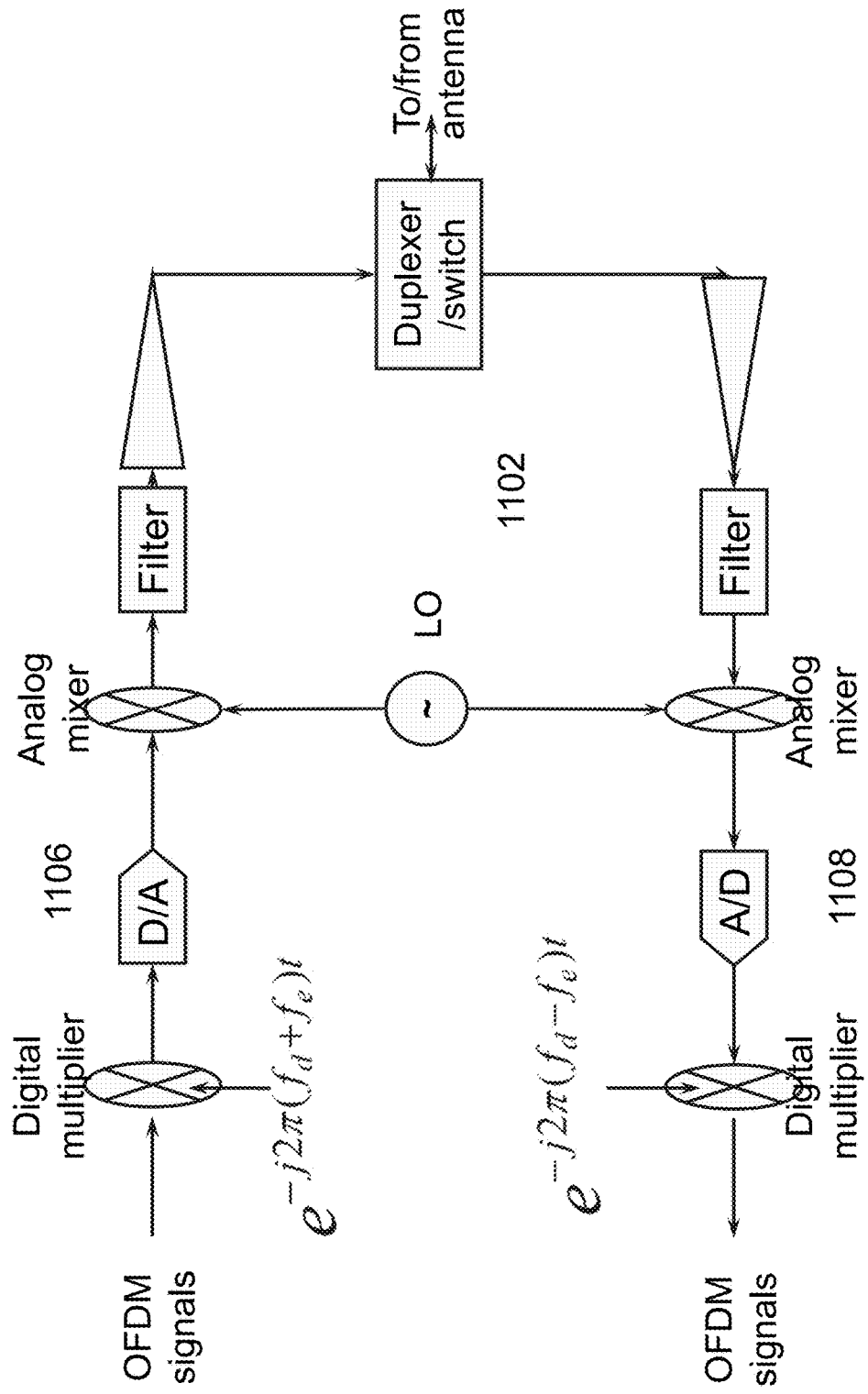
FIG. 11 is a block diagram of a signal conditioning circuit that utilizes a digital approach to frequency error correction.

In some embodiments, the clock frequency error and the Doppler shift are compensated for by digitally rotating the phase of the signals appropriately in the time domain. A specific example is given in FIG. 11 of this purely digital approach to composite frequency error correction. FIG. 11 is a block diagram of a signal conditioning circuit that operates in the digital domain in order to correct for composite frequency errors. The clock frequency error and the Doppler shift are corrected in the digital domain by rotating the phase of a signal to be transmitted using a digital multiplier 1106 (to pre-compensate signals for transmission), or by rotating the phase of a signal that has been received using a digital multiplier 1108 (to compensate received signals). When signal processing is performed in the digital domain, the local oscillator 1102 is not adjusted since the estimated clock frequency error is corrected by the multipliers.

While both the Doppler shift and clock frequency error may be estimated to correct for composite frequency errors, in some environments it may be beneficial to estimate and correct for only the Doppler shift or only the clock frequency error. Representative environments where this may be beneficial include, but are not limited to, those environments where the mobile device is stationary or the clock frequency error is minimal.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes are presented in a given order, alternative embodiments may perform routines having steps in a different order, and some processes may be deleted, moved, added, subdivided, combined, and/or modified to provide alternative or subcombinations. Each of these processes may be implemented in a variety of different ways. Further any specific numbers noted herein are only examples: alternative implementations may employ differing values or ranges.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. At least one non-transitory machine readable storage medium having instructions embodied thereon for performing cell synchronization at a mobile station, the instructions when executed perform the following:
    processing, using at least one processor of the mobile station, one or more synchronization signals received in a downlink from one or more base stations providing coverage in one or more cells, wherein the one or more synchronization signals received at the mobile station for cell synchronization are code sequences;
    processing, using at least one processor of the mobile station, the one or more synchronization signals received from the one or more base stations to synchronize the mobile station with the one or more base stations; and
    adjusting, using at least one processor of the mobile station, signals for communication from the mobile station in accordance with the cell synchronization performed at the mobile station.

2. The at least one non-transitory machine readable storage medium of claim 1, wherein the one or more synchronization signals include a first synchronization signal and a second synchronization signal.

3. The at least one non-transitory machine readable storage medium of claim 1, further comprising instructions when executed perform the following: processing the one or more synchronization signals to perform cell synchronization in a frequency domain.

4. The at least one non-transitory machine readable storage medium of claim 1, further comprising instructions when executed perform the following: processing the one or more synchronization signals to perform cell synchronization in a time domain.

5. The at least one non-transitory machine readable storage medium of claim 1, wherein the one or more synchronization signals are received at the mobile station periodically in multiple slots in an orthogonal frequency division multiplexing (OFDM) symbol.

6. An apparatus of a mobile station operable to perform cell synchronization, the apparatus configured to:
process, using one or more processors and memory at the mobile station, a first synchronization signal received in a downlink from a first base station;
process, using the one or more processors and memory at the mobile station, a second synchronization signal received in a downlink from a second base station, wherein the first synchronization signal and the second synchronization signals received at the mobile station for cell synchronization are code sequences;
process, using the one or more processors and memory at the mobile station, the first synchronization signal and the second synchronization signal more base stations to synchronize with the first and second base stations; and
adjust, using the one or more processors and memory at the mobile station, signals for communication from the mobile station in accordance with the cell synchronization performed at the mobile station.

7. The apparatus of claim 6, wherein the first synchronization signal is received at the mobile station periodically in multiple slots in an orthogonal frequency division multiplexing (OFDM) symbol.

8. The apparatus of claim 6, wherein the first synchronization signal and the second synchronization signal that occupy a center portion of a channel bandwidth.

9. The apparatus of claim 6, wherein the cell synchronization is performed at the mobile station in a frequency domain.

10. The apparatus of claim 6, wherein the cell synchronization is performed at the mobile station in a time domain.

11. An apparatus of a base station operable to facilitate cell synchronization at a mobile station, the apparatus comprising one or more processors and memory configured to:
process, from the base station, one or more synchronization signals for transmission to the mobile station in a downlink, wherein the one or more synchronization signals cause the mobile station to synchronize with the base station, wherein the one or more synchronization signals transmitted from the base station for cell synchronization with the mobile station are code sequences; and
process, at the base station, communication signals received from the mobile station, wherein the communication signals are adjusted at the mobile station for communication in accordance with the cell synchronization performed at the mobile station.

12. The apparatus of claim 11, wherein the one or more synchronization signals are transmitted to the mobile station to cause the mobile station to perform cell synchronization in a frequency domain.

13. The apparatus of claim 11, wherein the one or more synchronization signals are transmitted to the mobile station to cause the mobile station to perform cell synchronization in a time domain.

14. The apparatus of claim 11, wherein the one or more synchronization signals are transmitted periodically to the mobile station in multiple slots in an orthogonal frequency division multiplexing (OFDM) symbol.

15. The apparatus of claim 11, wherein the one or more synchronization signals transmitted from the base station include a first synchronization signal and a second synchronization signal.

16. The apparatus of claim 11, wherein the one or more synchronization signals transmitted from the base station include a first synchronization signal and a second synchronization signal, wherein the first synchronization signal is near-orthogonal to the second synchronization signal.

17. The apparatus of claim 11, wherein the one or more synchronization signals transmitted from the base station include a first synchronization signal and a second synchronization signal that occupy a partial bandwidth of a channel or an entire bandwidth of the channel.

* * * * *